Dec. 16, 1947.  D. E. RICE  2,432,803
SEALING MEANS FOR UNIVERSAL JOINTS
Filed July 27, 1944
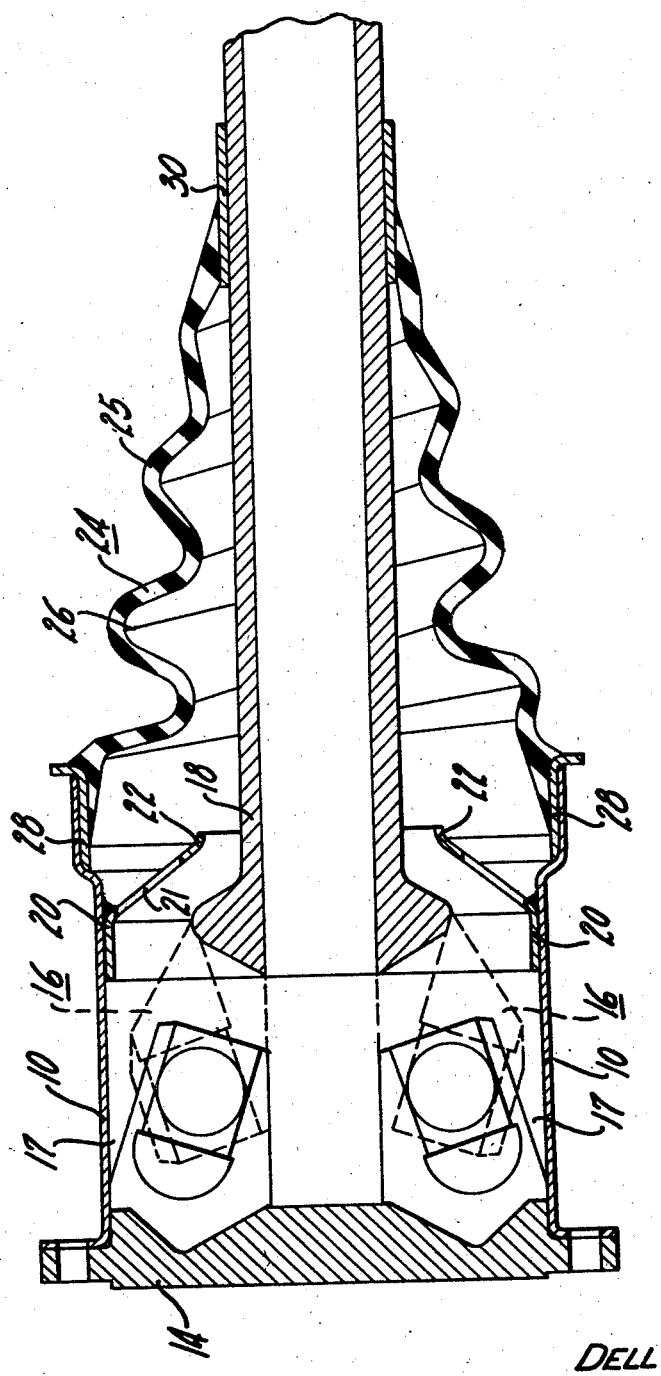
INVENTOR
DELL E. RICE
BY Cecil F. Arens
ATTORNEY Patented Dec. 16, 1947

2,432,803

UNITED STATES PATENT OFFICE 2,432,803

SEALING MEANS FOR UNIVERSAL JOINTS

Dell E. Rice, South Bend, Ind., assignor to Bendix Aviation Corporation, South Bend, Ind., a corporation of Delaware Application July 27, 1944, Serial No. 546,825

1 Claim. (Cl. 64—32)

This invention relates to sealing means for lubricated moving parts where it is desirable to retain lubricant around the parts and to prevent dirt and other foreign matter from coming into contact with the lubricated portion of the parts. The invention relates more particularly to sealing means for universal joints.

The conventional bellows or accordion type seal tends to trap oil in the corrugations during joint rotation. That is, the corrugations formed in the wall of this type seal create pockets which prevent the escape of oil to the reservoir during joint rotation. Oil trapped in this manner tends to expand or stretch the seal to a point of rupture due to centrifugal action of the oil caused by rotation of the joint. I have overcome this troublesome problem by eliminating the annular pockets in the wall of the seal and providing instead a helical channel or groove. The action of this helical channel is first to provide a continuous uninterrupted passage through which the lubricant may escape under centrifugal forces and second, to provide a screw action to impel the lubricant toward the reservoir prior to the time the mass of the lubricant in the seal begins to rotate with the seal. To obtain full advantage of these two actions the seal is disposed with respect to the joint and shaft so that the spiral groove of the seal advances axially toward the housing, and radially away from the shaft in an angular direction opposite to the normal direction of rotation of the shaft.

Seals of the conventional bellows type, for example, made from crude or synthetic rubber reinforced with nylon or cord require a multi-piece mandrel in the manufacture thereof so that the mandrel may be withdrawn. However, a seal constructed in accordance with the invention may be made from a one-piece mandrel which is merely unscrewed from within the article when manufacture is completed. This represents a saving in manufacturing costs.

One of the principal objects of the invention is to provide a universal joint sealing means which tends to return the lubricant during joint rotation to the chamber in which the joint is located notwithstanding the centrifugal action on said lubricant due to joint rotation tending to hold the lubricant against the wall of the seal.

Another important object of the invention resides in the provision of a flexible seal for universal joints which may be made from a single one-piece mandrel.

Another object of the invention lies in the provision of universal joint sealing means which is simple in construction and which may be manufactured at a minimum of cost.

The invention is illustrated in a single view in the drawing in which the reference numeral 10 designates an external closure member secured to a flange portion 14 and encompassing a universal joint 16 connected by a shaft 18 comprising a joint assembly. The closure 10 and flange portion 14 form a chamber 17 in which the joint 16 is located. The chamber provides a lubricant reservoir for the joint. An element 20, which is fixed to the closure member 10 in any suitable manner such as welding, has a depending circumferential reduced portion 22 integral therewith and adapted to retain the universal joint 16 in assembled relationship when removed from a vehicle, not shown, with which the joint may be associated. The element 20 has perforations 21 therein to allow for the free flow of lubricant to the reservoir.

My improved sealing means comprises a boot or seal 24 made of a flexible lubricant resistant material having a wall 25 formed with spiral grooves or corrugations 26 therein which tend to return the lubricant to the reservoir during rotation of the universal joint under centrifugal force and screw impeller action. This flexible member 24 has a sleeve 28 secured to one end in any suitable manner such as by vulcanizing. The sleeve 28 is press-fitted into the closure member 10 for securing the flexible member thereto but it is to be understood that other means for fastening these members together may be employed. A sleeve 30 of smaller diameter than the sleeve 28 is secured to the other end of the flexible member and adapted to be freely slidable on shaft 18 but closely fit to the shaft to obtain a minimum of leakage between the shaft and sleeve. The wall 25, which has its ends connected to the sleeves 28 and 30 of different diameters, forms a tapered or conical member which circumscribes shaft 18.

A seal of this type incorporating the spiral grooves 26 will tend to expel or return to the reservoir 17 during joint rotation any lubricant which may have been collected in the grooves. This discharge of lubricant from the seal during rotation is in an axial direction and has the advantage of redistributing the lubricant over the parts to be lubricated. Expelling the lubricant from the flexible seal during joint rotation has the additional advantage of relieving the pressure which would otherwise be exerted against the wall of the seal by the centrifugal action of the lubricant if it were trapped in the grooves. This minimizes the stresses taken by the seal, which will result in a decreased heating effect and will prolong the life of the seal. Furthermore, in forming the seal with helical corrugations inside and out the seal acts as a propeller during rotation to fan the air over the outside surface of the seal whereby an increased cooling effect of the sealing means is obtained.

Also the helical formation of the grooves 26 in the flexible member or seal 24 enables the use of a one-piece mandrel which need only to be unscrewed from the seal after the manufacturing process.

What I claim is:

In combination a universal joint having a driving shaft connected thereto and a closure member encompassing said universal joint to form a lubricant reservoir for said joint, a driven member integral with the universal joint and drivably connected to said driving shaft, sealing means for said joint comprising an axially extending flexible lubricant resistant member coaxial with said shaft and having a wall with interior and exterior surfaces formed with interior and exterior grooves, said interior grooves tending to return the oil to the reservoir during joint rotation, said interior and exterior grooves tending at the same time to fan the air in contact with the exterior surface of the flexible member whereby cooling thereof is effected, and a sleeve freely mounted on the shaft, said flexible member having one end securely fixed to said closure member and the other end secured to said freely mounted sleeve to permit axial displacement with respect to the shaft during a change in angularity of the joint.

DELL E. RICE.

REFERENCES CITED

The following references are of record in the file of this patent:

UNITED STATES PATENTS

| Number | Name | Date |
|---|---|---|
| 1,922,431 | Geyer | Aug. 15, 1933 |
| 2,323,569 | Rzeppa | July 6, 1943 |

FOREIGN PATENTS

| Number | Country | Date |
|---|---|---|
| 181,531 | Great Britain | 1922 |